United States Patent [19]
Townsend et al.

[11] 3,964,128

[45]* June 22, 1976

[54] APPARATUS FOR ENCASING A PRODUCT

[75] Inventors: Ray T. Townsend; Donald L. Beasley, both of Des Moines, Iowa

[73] Assignee: Townsend Engineering Company, Des Moines, Iowa

[ * ] Notice: The portion of the term of this patent subsequent to Sept. 17, 1991, has been disclaimed.

[22] Filed: Dec. 14, 1972

[21] Appl. No.: 315,100

[52] U.S. Cl. .......................................... 17/33; 17/42
[51] Int. Cl.² .......................................... A22C 11/00
[58] Field of Search ................................. 17/31–33, 17/34, 35, 42; 53/177; 403/90

[56] References Cited
UNITED STATES PATENTS

| | | | |
|---|---|---|---|
| 1,292,645 | 1/1919 | Reisfeld .................................. | 17/33 |
| 2,871,508 | 2/1959 | Hill ......................................... | 17/33 |
| 3,115,668 | 12/1963 | Townsend .............................. | 17/33 |
| 3,191,222 | 6/1965 | Townsend .............................. | 17/33 |
| 3,319,982 | 5/1967 | Schwartz ............................... | 403/90 |
| 3,382,745 | 5/1968 | Trimble ................................. | 17/34 |
| 3,399,423 | 9/1968 | Kielsmeier et al. ................... | 17/35 |
| 3,694,853 | 10/1972 | Greider ................................. | 17/33 |
| 3,835,503 | 12/1974 | Townsend et al. .................... | 17/35 |

FOREIGN PATENTS OR APPLICATIONS

| | | | |
|---|---|---|---|
| 696,864 | 9/1953 | United Kingdom .................. | 53/177 |
| 812,307 | 4/1959 | United Kingdom .................. | 17/33 |

Primary Examiner—Hugh R. Chamblee
Assistant Examiner—James D. Hamilton
Attorney, Agent, or Firm—Zarley, McKee & Thomte

[57] ABSTRACT

An apparatus for encasing a product including a product encasing machine, linking apparatus, and a looping apparatus. The product encasing machine includes a rotatable stuffing tube having a fin head mounted on its forward end. The fin head imparts rotational drive and longitudinal drag to the casing as the casing passes thereover as the casing is being filled. The rearward end of the stuffing tube is mounted in a socket type apparatus to permit the stuffing tube to be pivotally moved upwardly and laterally to facilitate the installation of the folded casing thereon. A modified device for supporting the discharge end of the stuffing tube is also disclosed comprising a split bearing member which embraces the rotating fin head and casing. The bearing member may be selectively opened to permit the stuffing tube to be pivotally raised to its loading position. The bearing member is spring loaded to permit different dragging forces to be selectively applied to the casing. A fluid intake is also provided for fluidly lubricating the interior surfaces of the stuffing tube to prevent smear. The linking apparatus includes a pair of loop members carrying pinching members thereon. The pinching members are constructed of a moldable material and are detachably mounted on the loop members. The pinching members include pinching surfaces adapted to engage and collapse the rotating casing issuing from the encasing machine. The pinching surfaces each include at least one portion in vertical alignment with the longitudinal center line of the loop on which it is carried so that it will travel at a uniform velocity as it is carried by the loop members. A separate control is provided for the rotation stuffing tube to permit the stuffing tube to be separately controlled as to speed independent of all other drives.

20 Claims, 31 Drawing Figures

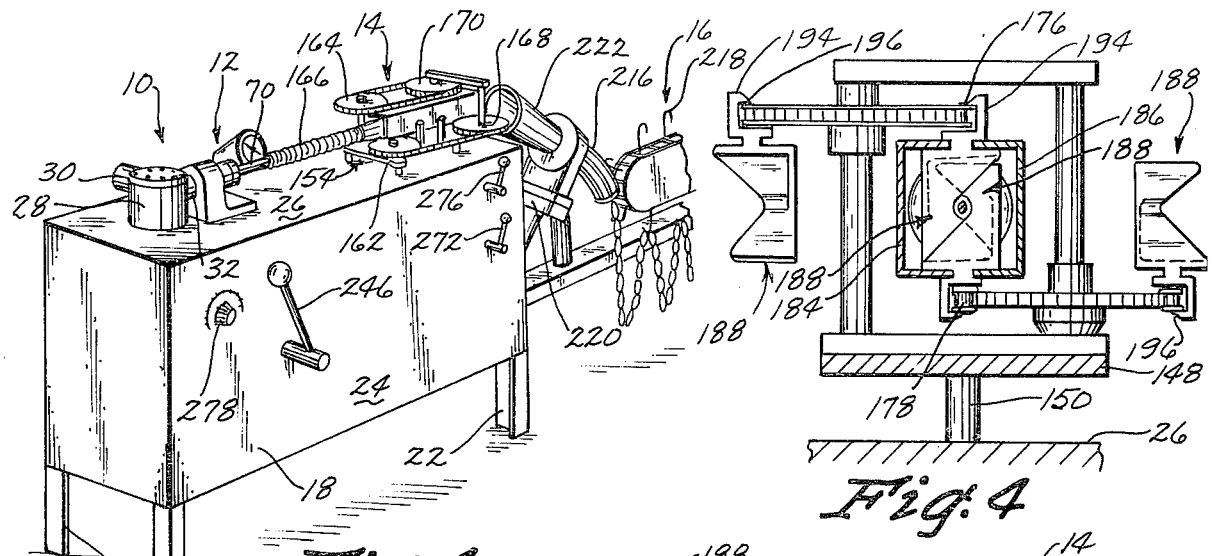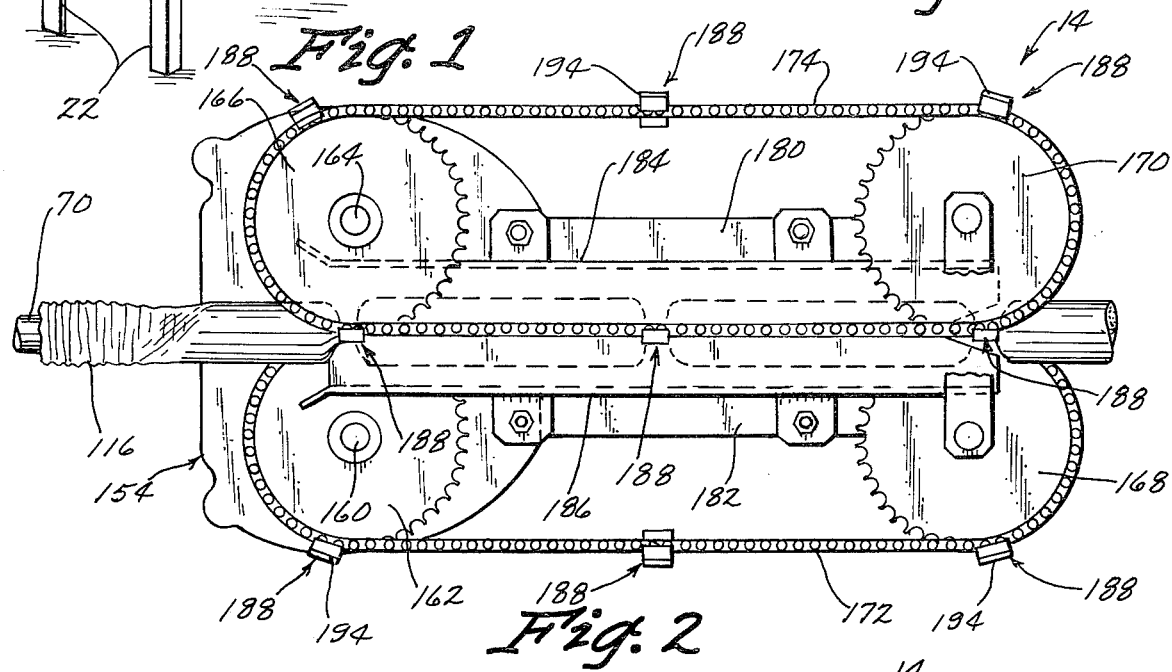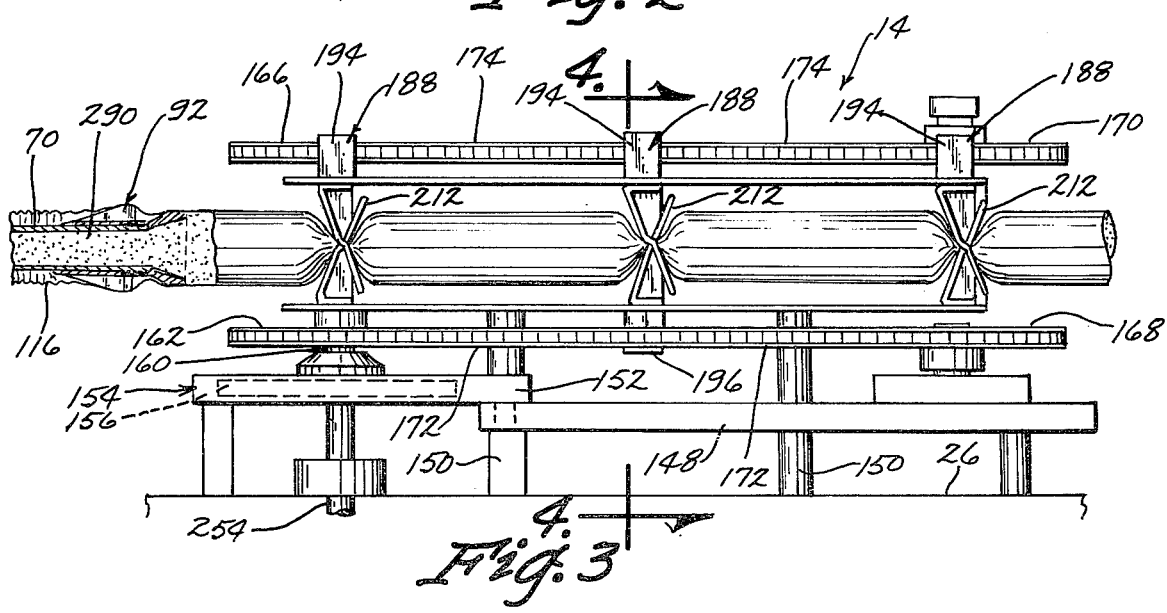

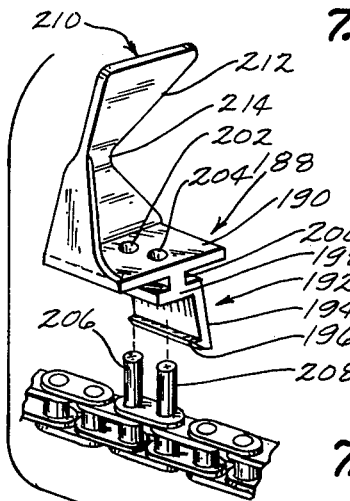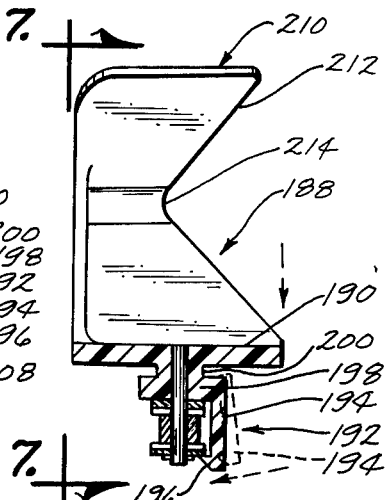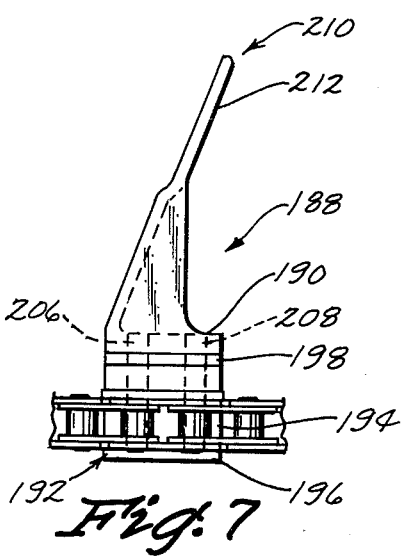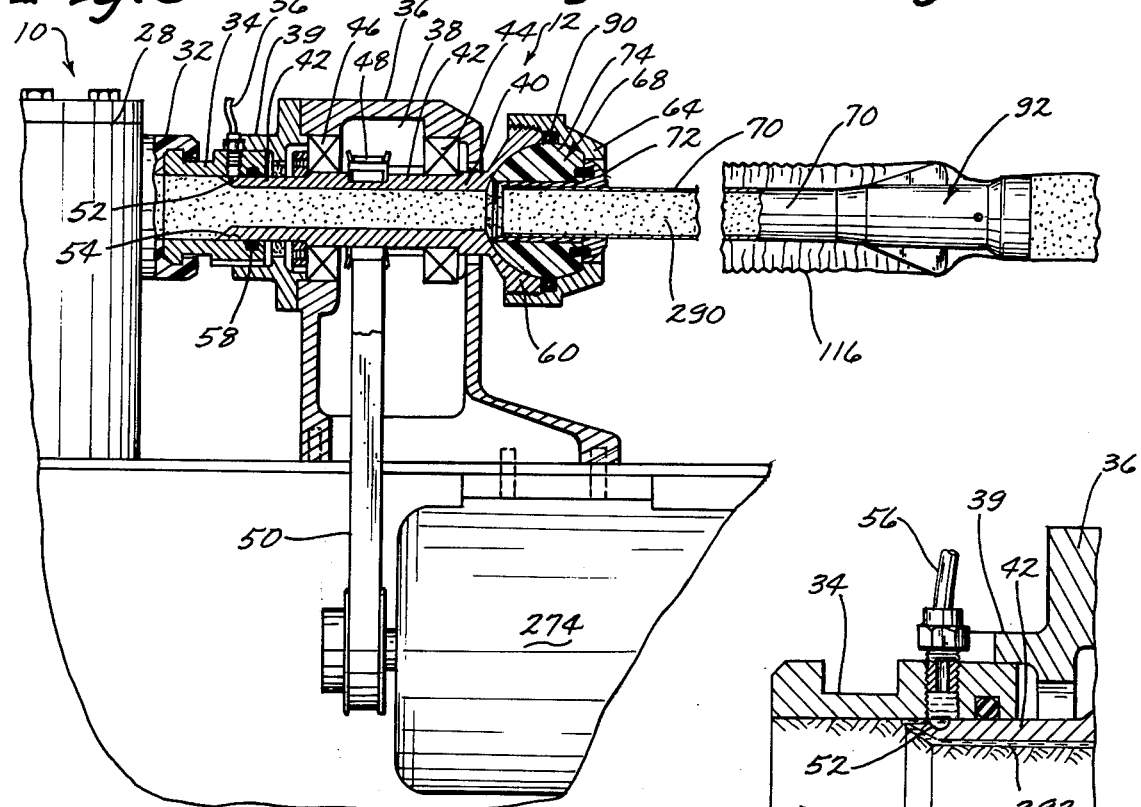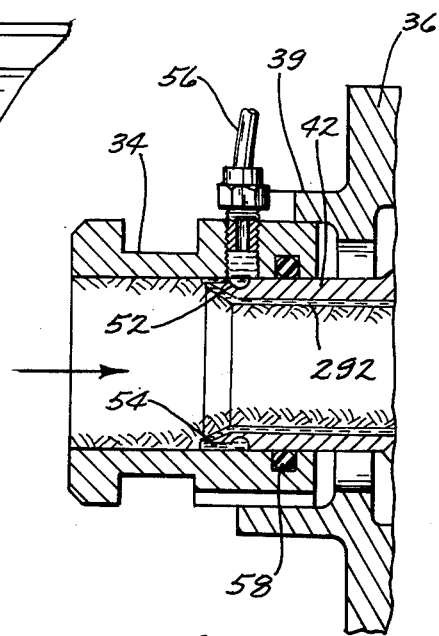

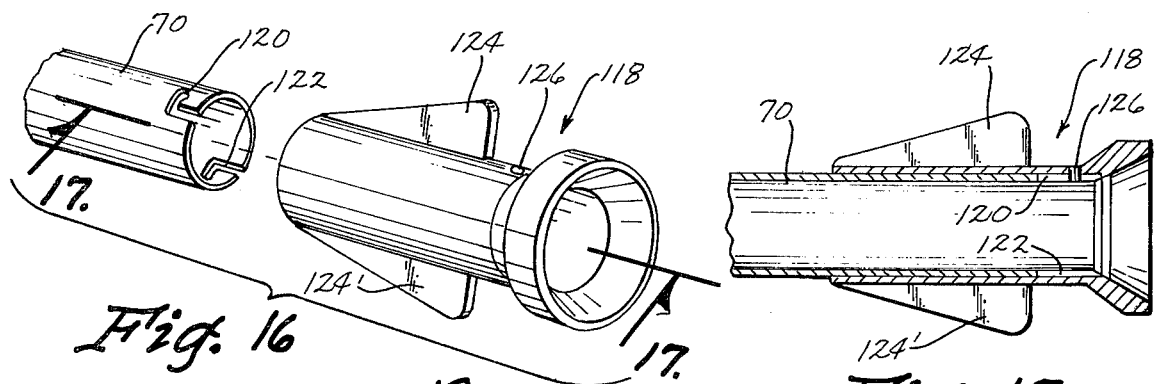
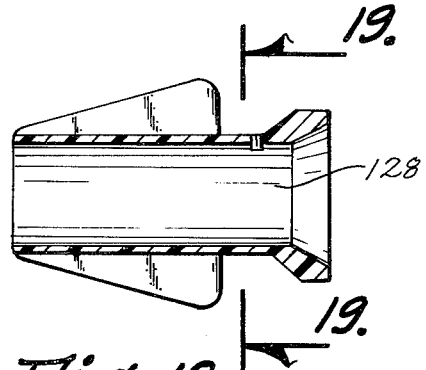
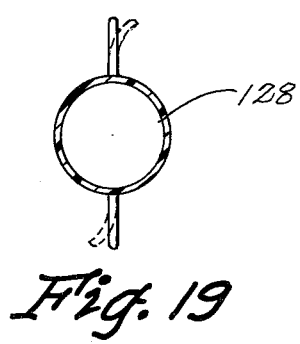
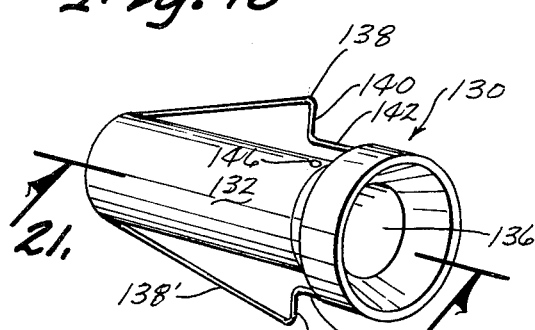
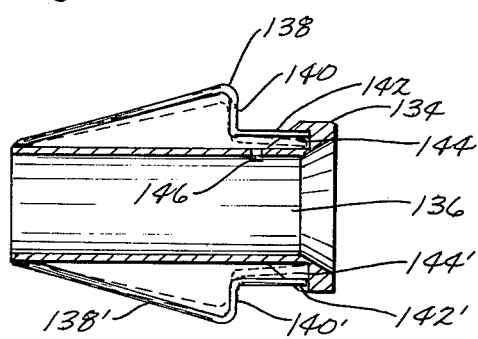
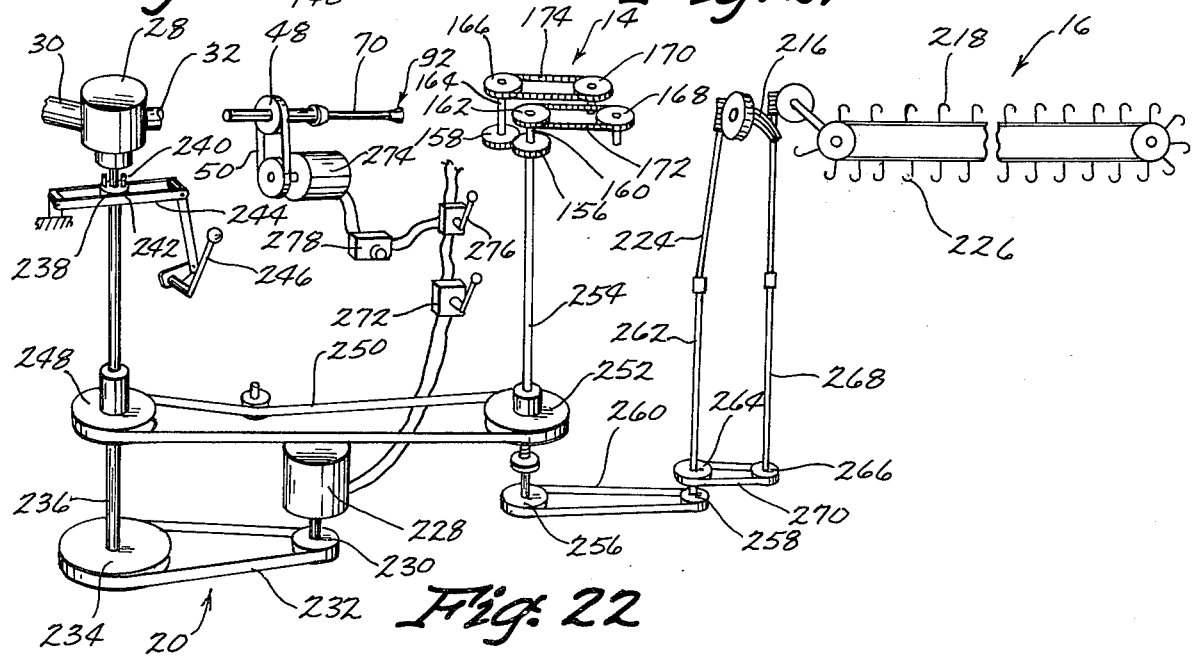

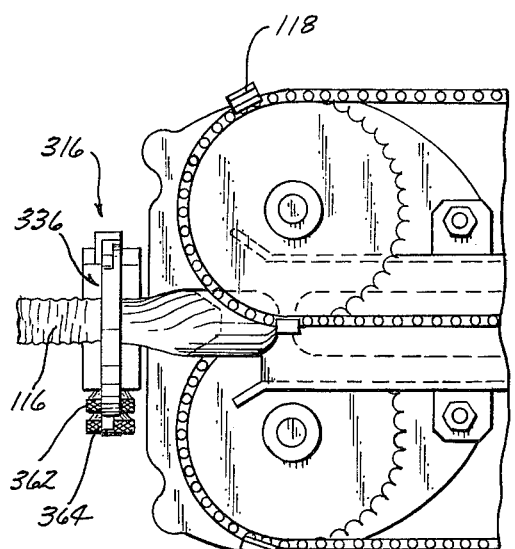
Fig. 23
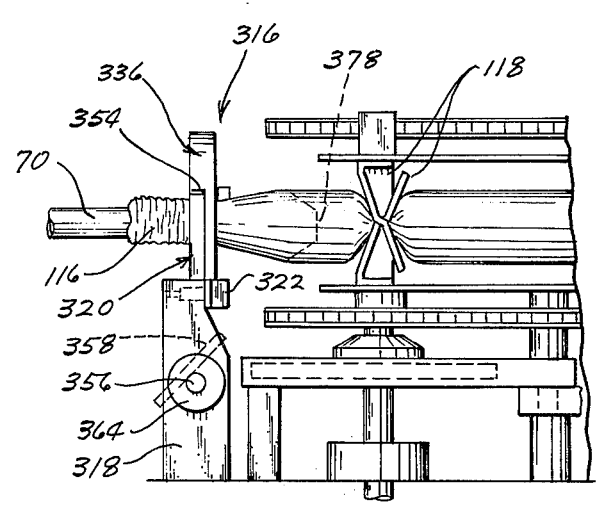
Fig. 24
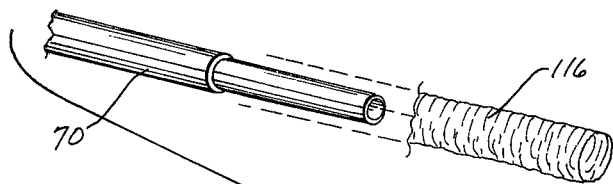
Fig. 25
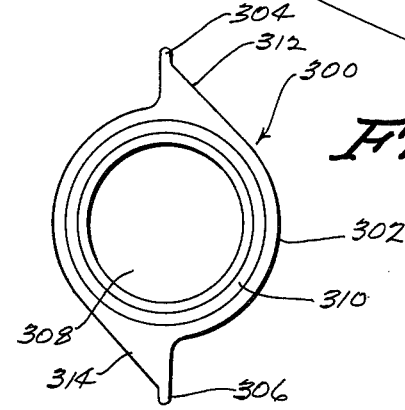
Fig. 27
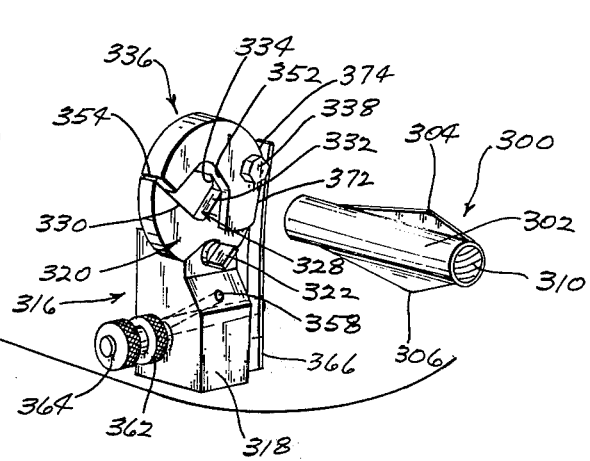
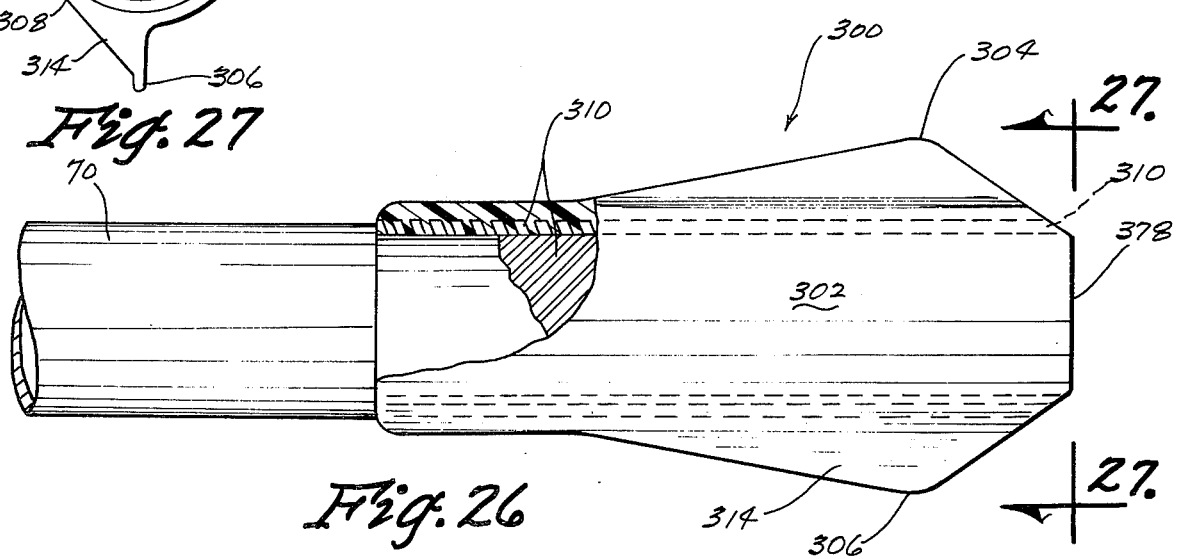
Fig. 26

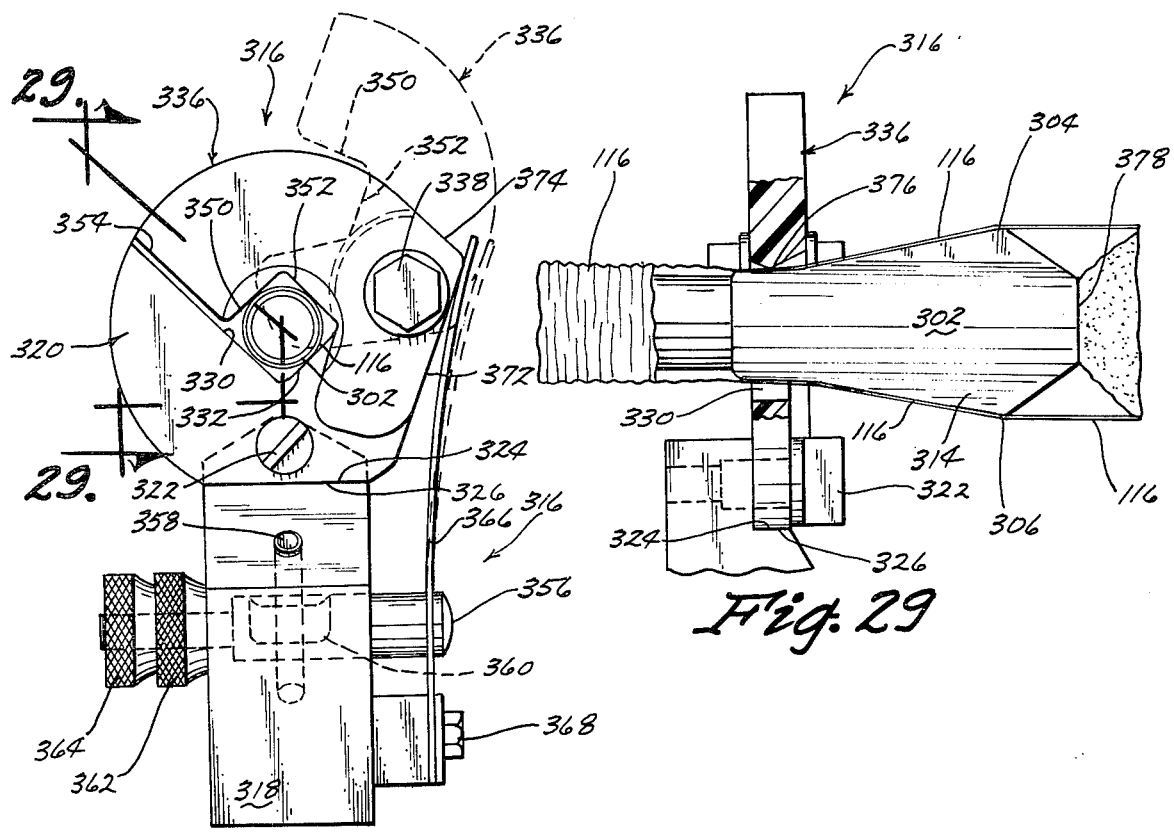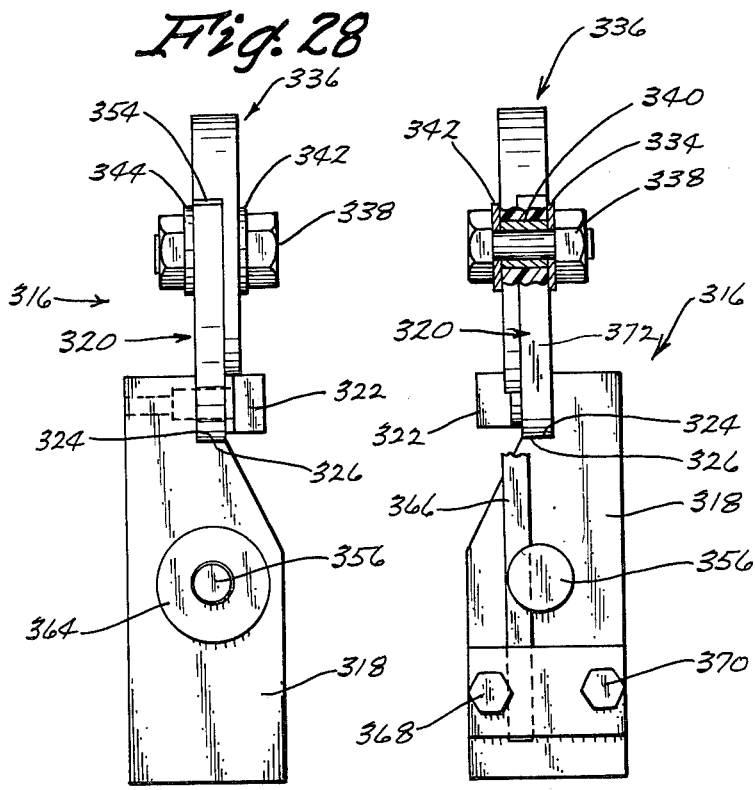

APPARATUS FOR ENCASING A PRODUCT

BACKGROUND OF THE INVENTION

This invention relates to a machine for encasing a product to provide sausage or franks and the like and more particularly to a machine capable of encasing a product within casings made of delicate material such as natural animal intestines or delicate artificial material.

Presently known product encasing devices include a stuffing tube, a pump for pumping plastic product through the stuffing tube, a rotary chuck in front of the discharge end of the stuffing tube, linking apparatus for linking the filled casing, and looping apparatus for arranging the links in loops. Prior to the encasing operation, a folded casing is mounted over the stuffing tube. The folded casing is compressed in an accordion-like fashion, and includes one unfolded end protruding beyond the discharge end of the stuffing tube. As the product issues from the discharge end of the stuffing tube, it fills the portion of the casing protruding therebeyond, thereby filling the casing and propelling it away from the discharge end so that additional portions of the casing will be unfolded and moved in front of the discharge end of the stuffing tube. Presently known devices utilize a non-rotatable stuffing tube and include a chuck surrounding the filled casings and rotating so as to impart rotation thereto. The rotating chuck causes the filled casing to rotate with respect to the yet unfilled folded casing on the stuffing tube. While this arrangement is satisfactory for casings made of strong materials such as cellulose, it is not satisfactory for more delicate materials such as natural casings made of animal intestines or some artificial dissolvable or edible casings which are easily torn and which cannot satisfactorily endure rotation. The rotation of the chuck causes a torsional force to be exerted between the rotating filled casing and the stationary casing on the stuffing tube, and often results in tearing of the casing at a point between the stuffing tube and the chuck. Existing devices cannot function with a continuous flow of meat.

Presently known linking devices are positioned in front of the discharge end of the stuffing tube in a position where they can engage the filled casing and pinch it at various points along its lengths so as to create a plurality of links. This pinching action collapses and weakens the cylinder of filled casing so that a twist is formed by the continuing rotation of the unpinched portion of the casing. Pinching is usually accomplished in present devices by means of V-shaped pinching members which engage the opposite sides of the casing and pinch it so as to cause a link to be formed therein. The pinching members are mounted on chains trained around two set of sprockets, and include V-shaped notches spaced radially outwardly beyond the path followed by the longitudinal center lines of the belts as they pass around the drive sprockets. Consequently, a whipping action is developed when the V-shaped notches are carried around each of the sprockets. This whipping action causes the pinching members to tear into the casing as they approach and engage the casing. While present linking devices generally do not cause tearing in cellulose casings, they very often cause natural or dissolvable casings to be torn or be jerked free from the action of the rotating chuck.

The present invention includes improvements over devices heretofore known in that it provides means for treating the casing gently as it is being filled and linked. The stuffing tube is adapted to rotate with a folded casing mounted thereon, and consequently the casing is rotated both before filling, during filling, and immediately after it is filled. A removable fin head is provided on the discharge end of the stuffing tube so as to impart rotational drive and longitudinal drag to the casing to give the casing an opportunity to completely fill.

Previous devices created "smear" in the finished product and such smear greatly detracts from the appearance of the product. Additionally, the previous devices do not have the necessary controls thereon to permit precise controlling of the product pump and coordination thereof with the rotating stuffing tube.

Therefore, a principal object of the present invention is to provide a product encasing apparatus which is capable of filling a delicate casing material without tearing it.

A further object of the present invention is the provision of an apparatus which will encase a product within natural casings and dissolvable casings presently being used.

A further object of the invention is the provision of an apparatus including a fin head on the rotating stuffing tube which imparts rotational drive and longitudinal drag on the casing so that the casing will completely fill.

A further object of the invention is to provide an apparatus including means for creating a lubricating film between the product and the rotating stuffing tube.

A further object of this invention is to provide an apparatus including improved pinching members in the linking apparatus which will carefully control the length of each segment of encased product without the imposition of substantial drag or tension on the casing material.

A further object of this invention is to provide an apparatus including guide channels thereon for supporting the franks or sausages.

A further object of the invention is to provide an apparatus including means for quickly and easily installing casings on the stuffing tube.

A further object of the invention is to provide a bearing means for supporting the discharge end of the stuffing tube which is spring loaded to permit different dragging forces to be selectively applied to the casing.

A further object of the invention is to provide a means for imposing internal and external drag forces on the casing as it is being filled.

A further object of the invention is to provide an apparatus which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the apparatus for encasing a product;

FIG. 2 is a top view of the linking portion of the apparatus;

FIG. 3 is a side view of the linking apparatus;

FIG. 4 is a sectional view seen along lines 4—4 of FIG. 3;

FIG. 5 is a perspective view of a pinching member and the chain upon which it is mounted;

FIG. 6 is an end view of the pinching member of FIG. 5 with portions thereof cut away to more fully illustrate the invention;

FIG. 7 is a side view of the pinching member of FIGS. 5 and 6 as seen along lines 7—7 of FIG. 6;

FIG. 8 is a partial sectional view taken through the encasing portion of the invention;

FIG. 9 is a sectional view illustrating the means for supplying a film of lubricating fluid between the stuffing tube and the product;

FIG. 16 is a view similar to FIG. 12 except that a modified form of the fin head is shown;

FIG. 17 is a sectional view seen along lines 17—17 of FIG. 16;

FIG. 18 is a sectional view of a further modified form of the fin head;

FIG. 19 is a sectional view seen along lines 19—19 of FIG. 18;

FIG. 20 is a perspective view of a still further modified form of the fin head;

FIG. 21 is a sectional view seen along lines 21—21 of FIG. 20;

FIG. 22 is a schematic view illustrating the drive and control system of the apparatus;

FIG. 23 is a top view of a modified means of supporting the stuffing tube and its relationship to the linking apparatus;

FIG. 24 is a side view of the modification of FIG. 23;

FIG. 25 is an exploded perspective view of the bearing means shown in FIGS. 23 and 24;

FIG. 26 is an elevational view illustrating a modified form of the fin head;

FIG. 27 is an end view as seen on lines 27—27 of FIG. 26;

FIG. 28 is an end view of the bearing means of FIGS. 23, 24 and 25;

FIG. 29 is a sectional view as seen on lines 29—29 of FIG. 28;

FIG. 30 is a side view of the bearing means of FIG. 28; and

FIG. 31 is a side view of the bearing means of FIG. 28 as seen from the opposite side of FIG. 30.

DESCRIPTION OF THE PREFERRED EMBODIMENTS

Figure 10:
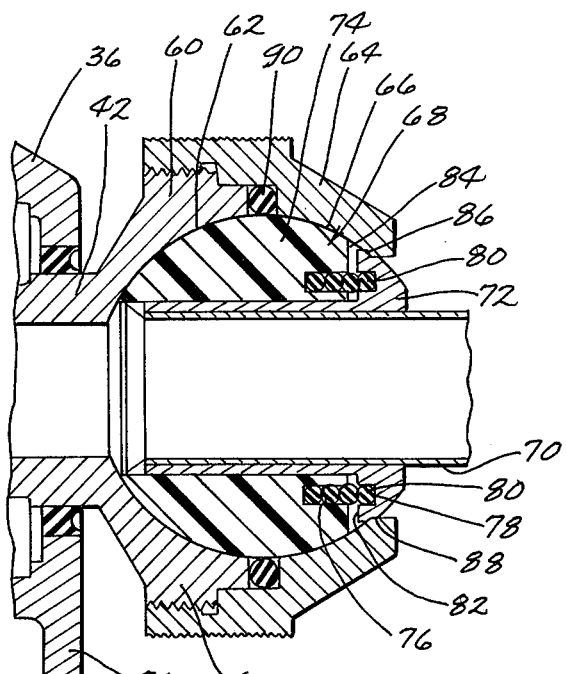
FIG. 10 is a partial sectional view illustrating the means for pivotally mounting the rearward end of the stuffing tube.

Referring to the drawings, the numeral 10 generally designates an apparatus for encasing a product so as to produce sausages, franks and the like. Apparatus 10 includes a casing filling machine 12, a linking apparatus 14, looping apparatus 16, and a support cabinet 18 having a drive system 20 (FIG. 22) enclosed therein.

Support cabinet 18 includes a plurality of support legs 22, four cabinet side walls 24, and a cabinet top 26. Casing filling machine 12 is mounted on and supported by cabinet top 26 and includes a product pump 28 which is adapted to pump products of plastic consistency. Product pumps of this type are known in the art and therefore further description of pump 28 is unnecessary other than to state that it includes an inlet 30 adapted to be connected to a conduit leading from a supply of plastic products, and further includes an outlet conduit 32 which is adapted to receive the product being discharged from the pump 28.

A spindle housing 36 includes a chamber 38 therein and further includes an inlet coupling 39 for retentively receiving the connecting conduit 34 therein. Connecting conduit 34 is also received by the outlet conduit 32 as illustrated in FIG. 8. Rotatably mounted within housing 36 is a spindle assembly 40 which includes a spindle tube 42 which is rotatably journaled in housing 36 by means of front and rear bearings 44 and 46. Spindle tube 42 includes a belt receiving track 48 on its outer surface. Track 48 includes a plurality of small teeth thereon adapted to engage teeth on the interior surface of a drive belt 50 which is trained around track 48.

An arcuate, annular channel 52 is formed in the exterior surface of spindle tube 42 forwardly of the rearward end thereof as illustrated in FIG. 9. The extreme rearward end of the spindle tube 42 has a reduced outside diameter portion to provide an annular passageway 54 which extends rearwardly from channel 52 to the rearward end of the spindle tube 42. A fluid inlet coupling 56 is threadably mounted on the connecting conduit 34 and is in communication with channel 52 as illustrated in FIG. 9. Inlet coupling 56 is in communication with a source of fluid under predetermined pressure for supplying the fluid, such as water, to the channel 52 and passageway 54. O-ring 58 is provided in the connecting conduit 34 and sealably embraces the exterior surface of the spindle tube 42 as shown in FIG. 9.

Spindle tube 42 is provided with a head 60 at its forward end having a semi-circular inner wall portion 62 formed therein as seen in FIG. 10. The numeral 64 refers to a collar which is adapted for threadable connection to the head 60 and which also has a semi-circular inner wall surface 66 which is complementary to the wall surface 62. Collar 64 is adapted to selectively maintain the assembly 68 therein which will be described in more detail hereinafter. The numeral 70 refers to a stuffing tube having its rearward end received by the assembly 68. More specifically, assembly 68 includes an inner support member 72 which is slidably received by the outer support member 72. Stuffing tube 70 is frictionally embraced by the inner support member 72 to prevent the separation thereof. Outer support member 72 is provided with an annular groove 76 formed therein while inner support member 72 is provided with an annular groove 78 formed therein which registers with the groove 76. A plurality of resilient O-rings 80 are positioned in the grooves 76 and 78 to normally maintain the inner and outer support members 72 and 74 in the position of FIG. 10. In the position of FIG. 10, shoulder 82 of inner support member 72 is spaced from the shoulder 84 of outer support member 74. Inner support member 72 is also provided with an annular indentation 86 formed therein which is adapted to engage the shoulder 88 of collar 64 when the components are in the position of FIG. 10. Thus, in the position of FIG. 10, the O-rings 80 yieldably maintain the stuffing tube 70 in the horizontal position due to the engagement of the shoulder 88 and the indentation 86. The stuffing tube 70 may be pivotally moved from the position of FIG. 10 to the position of FIG. 11 by simply applying rearward pressure to the inner support member 72 so as to compress the O-rings to permit the indentation 86 to be moved out of engagement with the shoulder 88. When indentation 86 has been moved out of engagement with the shoulder 88, the assembly 68 and the stuffing tube 70 may be moved to the position of FIG. 11. Movement of the stuffing tube 70 from the position of FIG. 11 to the position of FIG. 10 causes the assembly to be yieldably locked in the position of FIG. 10 since the O-rings 80 exert forward pressure on the inner support member 72 thereby urging the indentation 86 to again move into engagement with the shoulder 88. O-ring 90 is positioned between the collar 64 and the outer support member 74 and exerts a slight frictional pressure thereon to yieldably maintain the stuffing tube 70 in the position of FIG. 11.

Figure 12:
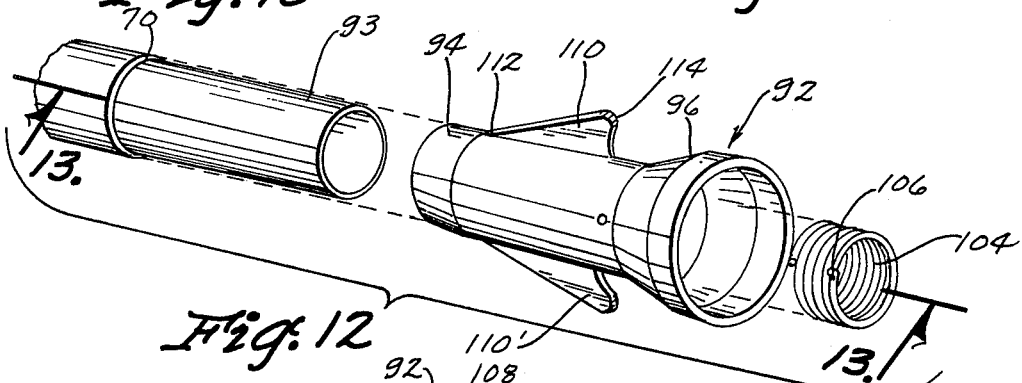
FIG. 12 is an exploded perspective view of a fin head and the discharge end of the stuffing tube.
Figure 13:
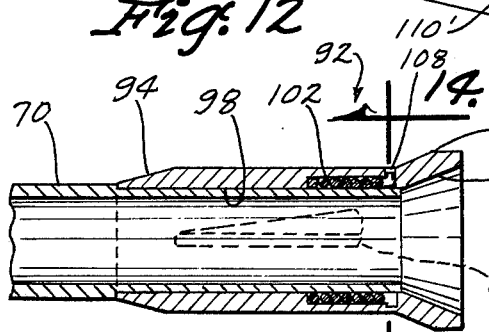
FIG. 13 is a sectional view seen along lines 13—13 of FIG. 12.
Figure 14:
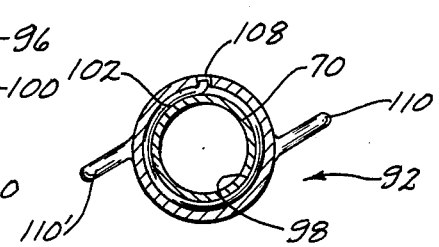
FIG. 14 is a sectional view seen along lines 14—14 of FIG. 13.
Figure 15:
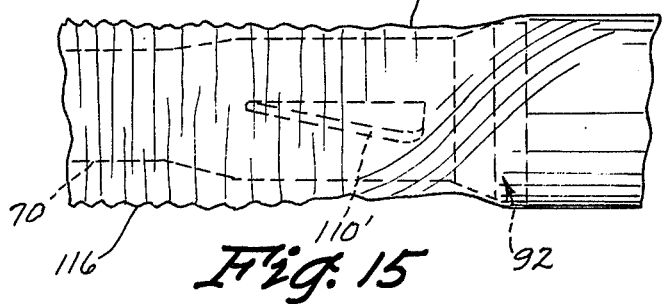
FIG. 15 is an elevational view illustrating the fin head of FIG. 12 and its relationship with respect to the stuffing tube and casing.

FIGS. 12–15 illustrate one form of a fin head that may be mounted on the forward end of the stuffing tube 70 and generally indicated by the reference numeral 92. As seen in FIG. 12, the forward end of stuffing tube 70 is provided with a reduced outside diameter portion 93. Fin head 92 includes an inwardly tapered portion 94 at its outer rearward end and includes an outwardly tapered portion 96 at its forward end. Fin head 92 has an elongated bore 98 extending therethrough which is adapted to embrace the forward end portion 93 of stuffing tube 70. Fin head 92 is also provided with a funnel-like opening 100 at its forward end which communicates with the bore 98. Fin head 92 has a spring compartment 102 formed in the inner forward end thereof adapted to receive the coil spring 104. Coil spring 104 has an outwardly extending end 106 which is received by the opening 108 formed in the fin head 92 as seen in FIG. 13. Coil spring 104 frictionally embraces the forward end of stuffing tube 70 as illustrated in FIG. 13 to provide a slip clutch arrangement therebetween. In other words, the coil spring 104 permits fin head 92 to rotate in a counterclockwise direction with respect to stuffing tube 70 as viewed in FIG. 12 while preventing clockwise rotation of the fin head 92 with respect to the stuffing tube 70. A pair of fins 110 and 110' extend outwardly from the fin head 92 as illustrated in FIG. 12. Fins 110 and 110' are identical and are oppositely disposed with respect to the fin head 92. As seen in FIG. 12, fin 110 includes a rearward end portion 112 and a forward portion 114. The fin 110 extends upwardly, forwardly and laterally from its rearward to forward ends. FIG. 15 illustrates the relationship of the fin head 92 and a casing generally referred to by the reference numeral 116.

A modified form of the fin head is illustrated in FIG. 16 and is referred to generally by the reference numeral 118. In FIG. 16, the stuffing tube 70 is provided with a pair of oppositely disposed L-shaped slots 120 and 122. Fin head 118 includes a pair of flexible fins 124 and 124' extending therefrom as seen in the drawings. The flexible characteristics of the fins 124 and 124' permit the same to be deflected as illustrated in FIG. 19 as will be explained in more detail hereinafter. Fin head 118 includes a pin 126 extending inwardly into the central bore 128 which is adapted to be received by either of the slots 120 and 122 to detachably secure the fin head 118 to the stuffing tube 70.

A further modified form of the fin head is illustrated in FIGS. 20 and 21 and is generally referred to by the reference numeral 130. Fin head 130 includes a body portion 132 having an outwardly tapered forward end 134 with the central bore 136 extending through the body portion 132 and end 134 as seen in FIG. 21. A pair of flexible wire fins 138 and 138' extend outwardly from the fin head 130 as seen in FIG. 21. The rearward ends of the fins 138 and 138' are secured to the body portion 132 by welding or the like. Each of the fins 138 and 138' extend forwardly and upwardly from their rearward ends and then extend inwardly towards the fin head to define shoulders 140 and 140' respectively. The fins 138 and 138' have forward end portions 142 and 142' respectively which are received by slots 144 and 144' formed in the end 134 to permit the fins to be deflected from the position illustrated by solid lines in FIG. 21 to the position illustrated by broken lines in FIG. 21. Pin 146 extends inwardly from the body portion 132 and would be received in the notches 120 or 122 of the stuffing tube 70.

A still further modified form of the fin head is illustrated in FIGS. 25, 26 and 27 and is generally referred to by the reference numeral 300. Fin head 300 includes a body portion 302 having a pair of flexible tapered fins 304 and 306 extending therefrom as illustrated in FIGS. 26 and 27. Fin head 300 is provided with a central bore 308 extending therethrough which is provided with flexible internal threads 310 formed in the wall surface extending therearound. The stuffing tube 70 in FIGS. 25 and 26 is provided with a reduced outer diameter portion which receives the fin head 300 in the manner shown in FIG. 26. As seen in FIG. 27, the fins 304 and 306 have tapered shoulder portions 312 and 314 respectively which extend to the body portion of the fin head. Preferably the fin head 300 is constructed of a suitable plastic material such as Delrin.

Linking apparatus 14 comprises a frame 148 which is supported above cabinet top 26 by means of a plurality of legs 150. Operatively secured above frame 148 is a gear plate 152 which cooperates with frame 148 to form a gear box 154 adapted to house a pair of intermeshing link drive gears 156, 158 (FIG. 22). Extending upwardly from gear 156 is a short shaft 160 which supports a sprocket or drive wheel 162 at its upper end. Extending upwardly from gear 158 is a long shaft 164 which supports a sprocket or drive wheel 166 at its upper end. Rotatably mounted on frame 148 in the same plane as sprocket 162 is a freewheeling sprocket 168, and also rotatably mounted on frame 148 is another freewheeling sprocket 170 which is in the same plane as drive sprocket 166. Trained around sprockets 162 and 168 is a first loop chain 172, and trained around sprockets 166 and 170 is a second loop chain 174. Chains 172 and 174 are positioned in horizontal planes spaced from one another and are positioned so they each have common portions 176 and 178, respectively, which pass in vertical alignment with one another. The elongated vicinity where portions 176 and 178 travel in vertical alignment will be generally referred to hereinafter as a linking station. Rigidly secured to frame 148 are a pair of backing plate members 180 and 182, which run along the opposite sides of the linking station. Elongated guide channels 184 and 186 are secured to the backing plates 180 and 182 respectively between the common portions 176 and 178 to provide a guide means for the franks or the like as the franks or the like pass through the linking station.

A plurality of pinching members 188 are detachably mounted on each of the loop chains 172 and 174. Each of the pinching members 188 comprises a base 190 having an attachment portion 192 positioned therebelow as illustrated in FIGS. 5, 6 and 7. Attachment portion 192 comprises a flexible wall 194 having a beveled shoulder 196 extending therefrom adjacent its lower end as viewed in FIG. 5. Attachment portion 192 also includes a base 198 at its upper end which extends laterally from the wall 194 and which is connected to the base 190 by a web portion 200. Openings 202 and 204 extend through the base 190, web portion 200 and base 198 for receiving the pins 206 and 208 from the loop chain as seen in FIG. 5. The pinching member 188 is secured to the loop chain by simply positioning the member 188 so that the pins 206 and 208 extend upwardly through the openings 202 and 204. The wall 194 is deflected outwardly from the chain to permit the pins to be extended upwardly through the openings 202 and 204. When base 198 is in engagement with the upper portion of the loop chain as seen in FIG. 6, the wall 194 is deflected towards the loop chain so that the shoulder 196 is positioned below the loop chain to maintain the pinching member 188 on the loop chain. Each of the pinching members 188 also comprises a wall or plate portion 210 which extends upwardly from the base 190 as seen in the drawings. The lateral edge of wall 210 is provided with a V-shaped notch 212 including an apex 214. Each of the apexes 214 of the pinching members 188 is in approximate vertical alignment with a longitudinal center line of each of the loop chains. While the exact apex of each notch 212 need not be in exact vertical alignment with the center lines, at least a portion of the V-shaped notch 212 should be in such vertical alignment. Such aligned portions, however, should preferably be adjacent apex 214. Because of their vertical alignment with the center line, apexes 214 or the portions adjacent thereto do not accelerate when passing around the outer peripheral edges of sprockets 162, 166 or sprockets 168 and 170. The pinching notches of previous devices are entirely outside the line formed by the center line in each loop chain. As a result of this arrangement, the pinching notches of the pinching members in previous designs accelerate as they move around the arcuate paths surrounding each sprocket. Notches 212 are an improvement over previous devices in that at least a portion of each notch 212 is positioned in direct vertical alignment below the center line of chain 174 or above the center line of chain 172 depending upon which chain the pinching member 188 is mounted upon. Consequently, at least a portion of each pinching notch 212 traces a path identical to, but spaced from, the longitudinal center line of the loop chain on which it is mounted. These aligned portions of notches 212 trace an arc around each sprocket which has a radius of curvature the same as the radius of curvature formed by the longitudinal center line of the sprocket chain on which it is mounted, thereby causing a minimum of whipping action of the notch as it passes around the sprocket. Preferably, the pinching member 188 is constructed of a suitable nylon material to permit the economical molding of the same. The pinching member 188 may be easily mounted on the loop chains in the manner previously described. When the machine is being used to form frankfurters, the franks would ordinarily be 6 or 12 inches long. Thus, the pinching members 188 would normally be installed on the chains every 6 inches. When 12 inch franks are desired to be manufactured, every other pinching member would be removed from the chains to form franks having a length of 12 inches.

Each pinching member 188 on chain 172 is adapted to cooperate with one of the pinching members 188 on the loop chain 174 as it passes by the linking station so as to collapse filled casing issuing from stuffing tube 70. The rotational movement of the casing rearwardly of the point where it is collapsed causes a twist to be imparted adjacent the point where the casing has been collapsed.

Looping apparatus 16 is positioned immediately forwardly of linking apparatus 14 so as to receive the linked casings issuing from linking apparatus 14. Looping apparatus 16 includes a swinging apparatus 216 and a loop conveying device 218. Swinging device 216 includes a support let 220 which is operatively secured to support cabinet 18. The stuffed casings are fed into the horn funnel 222 which in turn feeds the casings to the swinging device 216 which is driven by shaft 224. The swinging device or swing horn as it is commonly called is synchronized with the movement of the hooks 226 so that one hook passes by the extreme forward end of the swing horn 216 with each revolution made by the swing horn 216. Consequently, the linked casings are looped over each hook by the circular movement of the swing horn 216. After the linked casings have been looped over the hooks 226, they are conveyed away from the vicinity of the swing horn 216 by the movement of the conveyor chain.

Referring to FIG. 22, drive system 20 includes a motor 228 having a pulley 230 operatively connected to its output shaft. A first drive belt 232 is trained around pulley 230 and a similar but larger pulley 234 is mounted on the lower end of a pump drive shaft 236. The extreme upper end of drive shaft 236 includes a plurality of splines (not shown) thereon. Slidably mounted over the extreme upper end of shaft 236 is a pump clutch bearing 238 having a pair of upwardly presented teeth 240 thereon. Clutch bearing 238 is adapted to slide longitudinally on shaft 236, but engages the splines on the shaft 236 so that it is held against rotational movement with respect to shaft 236. Clutch bearing 238 is housed within a retaining collar 242 which permits rotational movement of clutch bearing 238 therein but which also holds clutch bearing 238 against axial movement of shaft 236. Retaining collar 242 is pivotally connected to a plurality of links 244 which in turn are connected to a pump clutch handle 246. Handle 246 is mounted on the outside of support cabinet 18 and is adapted to be manually manipulated to move clutch bearing 238 between a disengaged position wherein teeth 240 are spaced from pump 28 to an engaged position wherein teeth 240 engage pump 28.

Mounted on shaft 236 intermediate its ends is a variable speed pulley including means for manually controlling the speed thereof. Belt 250 is trained around pulley 248 and pulley 252 is mounted on shaft 254 which is connected to the sprocket 156 as seen in FIG. 2. Pulley 256 is operatively secured to the extreme lower end of the shaft 254 and is operatively connected to the pulley 258 by the belt 260. Pulley 258 is secured to the lower end of a shaft 262 which drives the swing horn 216. Pulley 264 is also secured to the shaft 262 for rotation therewith and is operatively secured to the pulley 266 on shaft 268 by belt 270. Shaft 268 is operatively connected to and drives the conveyor system.

Motor 228 is controlled by control switch 272 while motor 274 is controlled by the switch 276. A variable speed control 278 is provided between the switch 276 and the motor 274 to permit the speed of the motor 274 to be precisely controlled independently of any other component in the system. Thus, stuffing tube 70 may be rotated at any desired speed through the use of the control 278.

The means for supplying water to the connection 56 have not been shown but it should be understood that a variable output water pump would be provided and would be operatively connected to the meat pump 18. In other words, a suitable gear and pulley arrangement will be provided between the meat pump 18 and the water pump to coordinate the flow of water through the inlet 56 and the flow of meat through the pump 18.

Before the system is placed in operation, it is necessary to position the folded casing over the stuffing tube 70. The stuffing tube 70 is pivoted upwardly from the position of FIG. 10 to the position of FIG. 11 as previously described to facilitate the mounting of the casing 116 on the stuffing tube 70. Before the casing 116 is mounted on the stuffing tube 70, the fin head thereon is removed. The casing 116 is then slidably extended over the tube 70 and the fin head replaced thereon. The stuffing tube 70 is then pivotally moved from the position of FIG. 11 to the position of FIG. 10 so that it is properly positioned. Actuation of the motor 28 causes meat pump 28 to be activated as well as the water pump connected thereto. Actuation of the motor 28 also causes the linking and looping apparatus to be actuated. Actuation of the pump 28 causes the meat product, generally indicated by the reference numeral 290 to be pumped through the independently rotating stuffing tube 70. Water is forced rearwardly from the channel 52 through the passageway 54 and engages the advancing meat product as it enters the rearward end of the spindle tube 42. The liquid forms a lubricating film 292 between the meat product and the spindle tube. As the product advances, the water creates a continuous film in intimate contact with the interior surface of the stuffing tube 70 and the exterior surface of the meat product being pumped therethrough. The resulting product is superior in appearance since the lubricating qualities of the water prevents damage to the fat cells in the meat product and prevents smear from occurring. The fact that the flow of water is coordinated with the operation of the meat pump insures that a proper amount of lubricating water will be provided between the meat product and the spindle tube and stuffing tube.

The meat product is forced outwardly from the stuffing tube 70 through the fin head thereon and the meat product pulls the casing from the stuffing tube 70. The fins 110 and 110' on the fin head 92 impart rotational drive and longitudinal drag to the casing to provide the casing with an opportunity to completely fill as it passes from the end of the stuffing tube. The fins on the fin head may be either resilient or spring loaded as previously described.

The meat product is pumped into the casing as seen in FIG. 3 and is linked by the pinching members 188 as also previously described. The pinching members 188 may be easily replaced as desired thereby substantially reducing the amount of maintenance required on the linking apparatus. The guide channels 184 and 186 guide the franks or the like through the linking station with the links then being fed to the looping and conveying apparatus.

The fin heads 118 and 130 function substantially identical to the fin head 92 with the fins thereon imparting rotational drive and longitudinal drag to the casings thereon so that the casing will be completely filled as it leaves the stuffing tube. The fins may either be flexible or spring loaded to achieve the necessary rotational drive and longitudinal drag between the fins and the casing. As previously stated, the casings are mounted on the stuffing tube 70 by removing the fin head thereon. However, it should be noted that the casings could also be mounted on the stuffing tube 70 by threadably removing the collar 64 to permit the rearward end of the stuffing tube 70 to be removed from the assembly 68. The fin head 300 of FIGS. 25–27 functions substantially identical to the fin heads previously discussed. The internal threads 310 formed in fin head 300 provide a convenient means of mounting the fin head 300 on the stuffing tube. The fin head 300 is simply slipped onto the discharge end of the stuffing tube 70 as illustrated in the drawings. Although stuffing tube 70 has a smooth outer surface, the flexible threads 310 "grip" the stuffing tube 70 to yieldably maintain the fin head 300 thereon. The fin head 300 is easily removed from the stuffing tube 70 by simply applying a longitudinal pulling force thereon. In some instances, it may be necessary to apply a slight twisting motion to the fin head 300 to remove it from the stuffing tube.

With respect to all of the fin heads disclosed herein, it has been found that the most satisfactory results are obtained if the fins thereon are positioned as far forwardly on the fin head as possible. It has also been found that a fin head having two fins thereon provides the most efficient results. The diameter of the fin head should be as large as possible but small enough so that the casing can be slipped thereover.

Thus it can be seen that a unique apparatus for encasing a product results in a superior product being provided. Because the casing is rotated both before and after it is filled there are substantially minimal torsional forces applied to the casing during the filling operation. The fact that the material being continuously pumped into the casing is also rotating contributes additionally to the reduction of torsional forces applied to the casing. The pinching members on the linking apparatus do not accelerate substantially as they pass around the drive wheels which carry the chains which reduces the whipping action to a minimum when the pinching surfaces engage the casing and grip it to provide links.

A modified means for supporting the stuffing tube 70 is illustrated in FIGS. 23–25 and 28–31. In FIGS. 23–25 and 28–31, the numeral 316 refers generally to a bearing means comprising a base 318 which is mounted on the cabinet top 26 closely adjacent the linking apparatus 14. A bearing element 320 is secured to the upper end of base 318 by screw 322. As seen in FIG. 30, bearing element 320 is provided with a flat lower end 324 which is supported by a complementary surface 326 provided on base 318.

Bearing element 320 is provided with an opening 328 at its upper end which is defined by bearing surfaces 330, 332 and 334. Bearing element 336 is pivotally secured to bearing element 320 by means of bolt and nut assembly 338. As seen in FIG. 31, a bushing 340 is positioned in the registering bolt openings formed in bearing elements 320 and 336. Washers 342 and 344 are provided at the opposite ends of the bushing 340 for engagement with the bolt head and nut of the bolt assembly 338. Bearing element 336 is provided with an opening 348 which is defined by bearing surfaces 350 and 352. Bearing element 336 is also provided with an end portion 354 which is positioned closely adjacent but normally spaced from the upper end of the bearing surface 330.

A tension adjustment pin 356 is movably mounted in base 318 by means of retaining roll pin 358 which extends into the base 318 and through the notch 360 formed in pin 356. Adjustment nut 362 is threadably mounted on the end of pin 356 as is lock nut 364. The other end of pin 356 is secured to a spring 366 which has its lower end secured to base 318 by bolts 368 and 370. Spring 366 extends upwardly from pin 356 for engagement with either of the surfaces 372 or 374 formed on bearing element 336.

Figure 11:
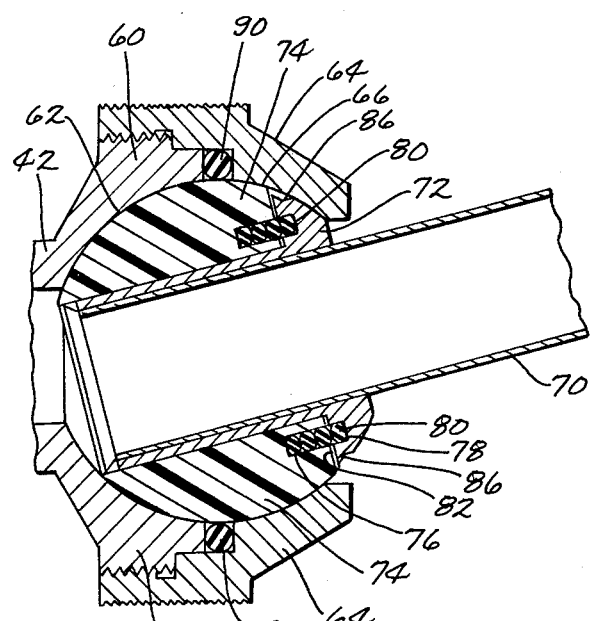
FIG. 11 is a view similar to FIG. 10 except that the stuffing tube has been pivotally moved with respect to its support means.

Preferably, the bearing elements 320 and 336 are constructed of a suitable plastic material such as Delrin. The bearing means 316 is ideally suited for use with a socket assembly such as illustrated in FIGS. 10 and 11. If the bearing means 316 is used with a socket assembly such as illustrated in FIGS. 10 and 11, it is not necessary to provide the means for locking the stuffing tube 70 in the horizontal position such as illustrated in FIG. 10. It is simply necessary to provide a socket connection at the rearward end of the stuffing tube 70 so that the tube may be raised from a horizontal position to an inclined position to permit the casings to be easily installed on the stuffing tube. Assuming that the stuffing tube 70 is in the horizontal operative position and that the bearing elements 320 and 336 are in their closed position, the normal method of operation is as follows. Bearing element 336 is pivotally moved from the position illustrated by solid lines in FIG. 28 to the position illustrated by broken lines in FIG. 28. The spring means 336 yieldably maintains the bearing element 336 in the open position due to the engagement of the upper end of the spring 366 with the surface 374. The stuffing tube 70 may then be moved upwardly about its socket connection so that the casings 116 may be installed thereon. Any one of the fin heads previously disclosed may then be placed on the end of the stuffing tube and the casing pulled thereover beyond the discharge end of the fin head. The stuffing tube 70, fin head and casing are then lowered into the opening 328 in the bearing element 320. Bearing element 336 is then pivotally moved from the position illustrated by broken lines in FIG. 28 to the position illustrated by solid lines in FIG. 28 so that the surfaces 330 and 332 of bearing element 320 engage a portion of the casing and so that surfaces 350 and 352 of bearing element 336 engage other portions of the casing. In other words, the bearing elements 320 and 336 cooperate to engage the casing at four locations such as illustrated in FIG. 28. It is preferred that bearing member 336 have a cross-sectional configuration such as illustrated in FIG. 9 so that only the tapered portion 376 engages the casing at two locations.

The bearing elements 320 and 336 impose an external dragging force on the casing 116 as the casing moves therethrough. The bearing elements 320 and 336 also urge the casing 116 into engagement with the external surface of the fin head so that both internal and external drag is applied to the casing as it moves therethrough. The amount of drag imposed on the casing 116 as it is being filled controls the hardness of the encased product. The amount of drag imposed on casing 116 is easily controlled through the use of the tension adjustment pin 356 which may be selectively moved so as to cause the spring 366 to impose more or less tension on the surface 372 of bearing element 336. In other words, if the tension adjustment pin 356 is tightened so that spring 366 imposes additional tension on the bearing element 336, the bearing element 336 will be urged into greater engagement with the casing 116 so as to achieve greater drag on the casing as it passes therethrough. The bearing means disclosed herein not only permits the selective adjustment of the drag on the casing but also prevents blow back of the meat product. While the bearing means 316 has been described as being used in conjunction with a fin head, it should be noted that the bearing means will satisfactorily perform if only a stuffing tube is being employed.

FIGS. 23 and 24 illustrate a modified structure wherein the discharge end of the stuffing tube or fin head is positioned closely adjacent the location wherein the pinching members 188 on the linking apparatus engage the filled casing. As seen in FIG. 24, the discharge end 378 of the fin head is positioned closely adjacent the location where the pinching members engage the filled casing which results in less internal pressure within the casing. The relationship illustrated in FIGS. 23 and 24 between the discharge end of the fin head or stuffing tube and the pinching members permits the product to be stuffed in the casing at lower pressures and eliminates the long columns of meat product which are normally present between the end of the stuffing tube and the pinching members. The relationship described above enables the pinching elements or members to retard the flow of the casing without exerting objectionable tension thereon. This is especially important in the continuous flow stuffing operations.

Thus it can be seen that the device accomplishes at least all of its stated objectives.

We claim:

1. Apparatus for encasing a product comprising,
a support,
an elongated stuffing tube having a product receiving rearward end and a discharge forward end, said tube being rotatably mounted on said support for rotation about its longitudinal axis, said forward end of said stuffing tube being adapted for protruding within and supporting a folded casing whereby rotation of said stuffing tube causes rotation of said folded casing;
means for introducing said product into said rearward end of said tube and for forcing said product out of said tube through said forward end into said casing; and
drive means for rotating said stuffing tube thereby imparting a rotation to said casing both before and after it is filled;
said stuffing tube being operatively selectively pivotally secured at its rearward end to said support, the forward end of said stuffing tube being movable at least upwardly from said support so that the folded casing may be slipped thereover.

2. The apparatus of claim 1 wherein said support comprises a rotatable spindle tube assembly having a forward end, a rotatable socket assembly on the forward end of said spindle tube assembly, said stuffing tube being secured to said socket assembly to permit the forward end of said stuffing tube to be moved upwardly and laterally with respect to said support.

3. The apparatus of claim 2 wherein said socket assembly has means thereon for yieldably maintaining said stuffing tube in an operative position.

4. The apparatus of claim 3 wherein said socket assembly also has means thereon for yieldably maintaining said stuffing tube locked in an inoperative position with said stuffing tube being upwardly moved from said operative position.

5. The assembly of claim 3 wherein said means for yieldably maintaining said stuffing tube in an operative position maintains said stuffing tube in a horizontally operative position.

6. The assembly of claim 3 wherein said means on said socket assembly for yieldably maintaining said stuffing tube in an operative position can be moved to place said stuffing tube in an inoperative position by applying rearward and upward pressure to said stuffing tube.

7. The apparatus of claim 1 wherein said apparatus has means for introducing a continuous film of lubrication fluid in intimate contact with the interior surface of the stuffing tube and the exterior surface of the product being pumped.

8. The apparatus of claim 7 wherein said means for creating a film of lubricating fluid comprises a fluid passageway means in operative fluid communication with the rearward end of said stuffing tube, and a fluid conduit in communication with a source of fluid and said fluid passageway means.

9. The apparatus of claim 1 wherein a bearing means is secured to said support adjacent the forward end of said stuffing tube, said bearing means comprising means for yieldably embracing said casing to impose drag thereon as said casing moves therethrough.

10. The apparatus of claim 9 wherein said bearing means urges said casing into at least partial engagement with said stuffing tube so that internal and external drag is imposed on said casing.

11. The apparatus of claim 1 wherein a bearing means is secured to said support adjacent the forward end of said stuffing tube, said bearing means comprising a first bearing element adapted to at least partially yieldably embrace said casing and stuffing tube, and a second bearing element which cooperates with said first bearing element to at least partially embrace said casing and stuffing tube.

12. The apparatus of claim 11 wherein said second bearing element is pivotally secured to said first bearing element and is movable between closed and opened positions with respect to said first bearing element, said second bearing element being movable to its opened position to permit the forward end of said stuffing tube to be moved upwardly therefrom so that the folded casing may be slipped thereover.

13. The apparatus of claim 12 wherein a spring means operatively engages said second bearing member to yieldably urge said second bearing member to its closed position.

14. The apparatus of claim 13 wherein said spring means is adjustable to permit the selective adjustment of the amount of yieldable force imposed on said second bearing element by said spring means to vary the amount of drag imposed on said casing by said bearing means.

15. The apparatus of claim 11 wherein said first bearing element has first and second bearing surfaces formed thereon which are disposed at substantially right angles to each other, said second bearing element having first and second bearing surfaces formed thereon which are disposed at substantially right angles to each other, said bearing surfaces on said bearing elements cooperating to engage the casing at three spaced apart positions as said casing moves therethrough.

16. The apparatus of claim 15 wherein at least some of said bearing surfaces are substantially V-shaped.

17. The apparatus of claim 11 wherein said bearing elements are comprised of a plastic material.

18. The apparatus of claim 11 wherein a fin head means is mounted on the forward end of said stuffing tube, said first and second bearing elements urging said casing into engagement with said fin head means.

19. The apparatus of claim 11 wherein said second bearing element is movably mounted with respect to said first bearing element and is movable between closed and opened positions with respect to said first bearing element, said second bearing element being movable to its opened position to permit the forward end of said stuffing tube to be moved upwardly therefrom so that the folded casing may be slipped thereover.

20. The apparatus of claim 1 wherein a bearing means is secured to said support adjacent the forward end of said stuffing tube, said bearing means comprising means for yieldably embracing said casing to impose drag thereon as said casing moves therethrough.

* * * * *